United States Patent [19]

Népote

[11] 4,067,512
[45] Jan. 10, 1978

[54] HYDRAULIC BRAKE FOR A FISHING REEL

[75] Inventor: Alain Népote, Cluses, France

[73] Assignee: The Garcia Corporation, Teaneck, N.J.

[21] Appl. No.: 765,581

[22] Filed: Feb. 4, 1977

[30] Foreign Application Priority Data

Feb. 9, 1976 France ................................ 76.03799

[51] Int. Cl.² ............................................. A01K 89/02
[52] U.S. Cl. .................................. 242/84.5 R; 60/584;
188/72.4; 242/219
[58] Field of Search ................... 242/84.5 R, 84.51 R,
242/211, 217, 218, 219, 220, 221; 188/344, 72.4;
60/584

[56] References Cited

U.S. PATENT DOCUMENTS

| 2,298,481 | 10/1942 | Hayes | 242/84.5 R |
|---|---|---|---|
| 2,571,323 | 10/1951 | Yoder | 188/112 |
| 3,322,369 | 5/1967 | Haenelt, Jr. | 242/84.5 R |
| 3,333,418 | 8/1967 | Harvey | 60/584 |
| 3,993,267 | 11/1976 | Murvall | 242/217 |

Primary Examiner—Billy S. Taylor
Attorney, Agent, or Firm—Fitzpatrick, Cella, Harper & Scinto

[57] ABSTRACT

A fishing reel, of the type having a rotating line spool, includes an hydraulic braking system for the spool. The braking system comprises a manually operable lever associated with a piston in a first hydraulic cylinder through which fluid forces are applied to a second piston operating friction plates bearing upon the reel spool. A third, spring loaded, piston is located in a second cylinder in fluid connection with the first cylinder.

10 Claims, 1 Drawing Figure

HYDRAULIC BRAKE FOR A FISHING REEL

BACKGROUND OF THE INVENTION

The present invention relates generally to drag or braking mechanisms for fishing reels; and, more specifically, the invention concerns fishing reels of the type consisting of a rotary-mounted spool for the fishing line, means of braking the rotation of the spool manually adjustable through an hydraulic cylinder containing a first piston kinematically connected with the adjustment means and a second piston kinematically connected with the braking means.

In known devices of this kind, such as exemplified in U.S. Pat. No. 3,322,369, the second piston acts on ramps, each integral with one of the jaws of a drum brake. The hydraulic cylinder serves to transmit the diplacement of the manually adjustable piston to the second piston and to the brake jaws. Therefore, once the different elements constituting the braking means are brought in contact with each other, the braking force is applied abruptly, since nothing is provided to reduce the displacement of the manually adjusted piston. In fact, for a relatively slight displacement of the adjustment piston, a very rapid increase of braking force occurs. This is undersirable for a number of reasons, one of which being line breakage upon abrupt braking.

The fishing reel according to the present invention avoids the aforesaid problem since the force exerted on the braking means by the adjustment means is applied very gradually.

SUMMARY OF THE INVENTION

A fishing reel in accordance with the present invention comprises a housing rotatably supporting a line spool; brake means constructed and arranged to apply frictional braking forces to the sides of said spool; a first hydraulic cylinder housed within said housing having first and second pistons, said first piston being manually operative and said second piston being operative by fluid pressure applied thereto to apply said braking forces; and a second cylinder housed within said housing in fluid connection with said first cylinder; a third piston arranged in said second cylinder, said third piston being elastically biased to constantly maintain fluid in said cylinders under pressure whereby said braking force may be gradually applied by manually displacing said first piston.

There has thus been outlined, rather broadly, the more important features of the present invention in order that the detailed description thereof that follows may be better understood and in order that the present contribution to the art may be appreciated. There are, of course, additional features of the invention that will be described hereinafter and which will form the subject of the claims appended hereto. Those skilled in the art will appreciate that this invention may be utilized for designing other structures for carrying out the several purposes of the invention. It is, therefore, important that the claims be regarded as including such equivalent constructions as do not depart from the spirit and scope thereof.

BRIEF DESCRIPTION OF THE DRAWINGS

One embodiment of the invention has been chosen for purposes of illustration and description, and is shown in the accompanying drawing wherein.

DESCRIPTION OF THE INVENTION

Figure 1:
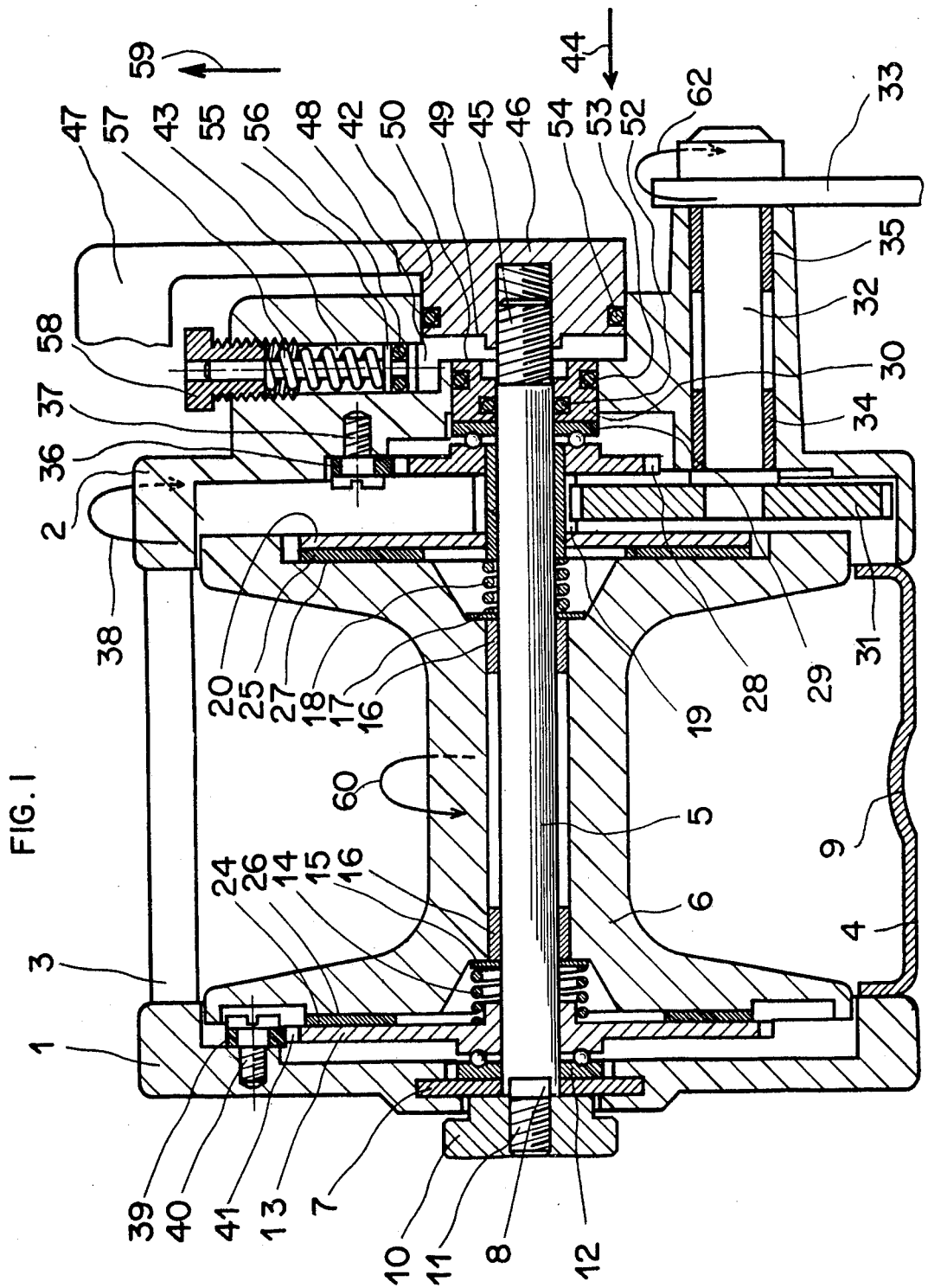
FIG. 1 is a cross-section view taken along the longitudinal axis of a fishing reel according to the invention.

As illustrated in FIG. 1, a fishing reel incorporating the invention has a conventional body formed of two lateral flanges or side plates 1 and 2 spaced apart by crosspieces 3 and by a crosspiece 4 having a contoured area 9 for attachment thereof to a rod (not shown). Between flanges 1 and 2 a central shaft 5 is mounted, on which a spool 6 is supported for rotation. A washer 7 is moulded in flange 1 and contains a hole provided with two flats, the dimensions of which correspond with two matching flats 8 provided on the end of shaft 5. The shaft is thus immobilized from rotation and is also immobilized axially by a nut 10 screwed on a threaded terminal part 11. Progressing from left to right on the drawing, after washer 7, there is, threaded on shaft 5, a first ball bearing generally indicated by the numeral 12, one race of which is integral with a first brake plate 13. A first compression spring 14 is positioned between brake plate 13 and a thrust washer 15 abutting spool 6. Two bearings 16 support spool 6 on shaft 5 and a second thrust washer 17 abuts the opposite side of spool 6 for a second compression spring 18. The latter bears on one side of a pinion 19 integral with a second brake plate 20. Brake plates 13 and 20 each include an inwardly facing friction gasket 24 and 25 arranged to engage the lateral faces 26 and 27 of spool 6. The first spring 14 constantly tends to separate face 26 axially from gasket 24. Similarly, the second spring 18 constantly tends to separate face 27 axially from gasket 25.

Pinion 19 supports ratchet 28 which bears on a second ball bearing generally indicated by the numeral 29, which, in turn, bears on a first, inward face of a piston 30 through which shaft 5 extends. Piston 30 is mounted within a housing defined by lateral flange 2 to slide axially around shaft 5. On the inward face of flange 2, a pawl 36, pivoted on a screw 37, is mounted to engage ratchet 28 to prevent the latter from turning in the direction of arrow 38. Similarly on the inward face of flange 1, another pawl 39, pivoted on a screw 40, is mounted to engage a ratchet 41 provided on the periphery of brake plate 13 to also prevent the latter from turning in the direction of arrow 38.

Pinion 19 is driven by a toothed wheel 31 integral with a shaft 32 of a crank 33. Shaft 32 is mounted for rotation in two bearings 34 and 35 supported within a housing defined by lateral flange 2. The end of shaft 5, adjacent to crank 33, is threaded at 45 to accept a nut 46 integral with an operating lever 47. Nut 46 has an outer cylindrical periphery 42 housed, at least partially, in a cylindrical housing 48 of corresponding diameter defined in flange 2. Housing or cylinder 48 is filled with hydraulic fluid and constitutes a first hydraulic cylinder. Face 49 of nut 46 constitutes the face of a first piston which is axially displaceable by the rotation of lever 47. Piston 30 has a face 50 directed into cylinder 48 and thus comprises a second piston axially displaceable by hydraulic pressure. In the illustrated embodiment, the second piston 30, has a smaller section than that of the first piston, nut 46. Fluid tightness of hydraulic cylinder 48 is assured by O-rings 52, 53 and 54.

A third piston 55 is set in a second cylinder 43 within lateral flange 2 in fluid connection with the first cylinder 48. O-ring 56 assures fluid tightness of piston 55 which is subjected to the action of a helical compression spring 57 keeping it in pressure against the hydraulic fluid in the cylinders. This third piston 55 is placed in flange 2 perpendicular to the axis of cylinder 48. A cap 58 threaded to the end of cylinder 43 permits regulation of the tension of spring 57 exerted on piston 55. The section of the third piston 55 is, for example, less than that of the second piston 30. In a particularly preferred embodiment, the first, second and third pistons 46, 30 and 55 have sections equal to 600 mm$^2$, 300 mm$^2$ and 40 mm$^2$ respectively.

Operation of a reel embodying the present invention is as follows. When line is being let out of the reel in the direction of arrow 38, operating lever 47 occupies a first position such that spool 6 is entirely free or very slightly braked, spring 57 then being completely released or very slightly compressed. Pawls 36 and 39 do not interfere with this rotation of spool 6 in this direction.

When a fish has taken the bait, it is necessary to work the brake so as to tire the fish, while letting spool 6 turn in the direction of 38. For that purpose, lever 47 is rotated, which causes the displacement of nut 46 in the direction of arrow 44 so that the hydraulic fluid contained in cylinders 48 and 43 drives back piston 30 in the direction of arrow 44 and the third piston 55 in the direction of arrow 59. The displacement of the second piston 30 causes frictional engagement of gasket 25 and face 27 of spool 6, by means of ball bearing 29, pinion 19 and brake plate 20. Spool 6 is, itself, then displaced in the direction of arrow 44, its opposite side face 26 thus engaging gasket 24 of brake plate 13. The more nut 46 is displaced in the direction of 44, the more the third piston 55 recedes in the direction of arrow 59 against the action of spring 57 and the greater the braking pressure is exerted on the second piston 30. At all times the pressures exerted on nut 46, piston 30 and the third piston 55 are identical. The braking force exerted on piston 30 and the force exerted on nut 46 are always in the same ratio as their respective sections. With the preferred sections identified above, the forces would be in the ratio of 300 to 600 mm$^2$. The force exerted by spring 57 on the third piston has no effect on the braking force, but does act on the effect of nut 46 and, therefore, of lever 47 in order to obtain a given braking effort. Thus, for example, if spring 57 is extremely rigid, everything occurs roughly as if the third piston did not exist; the braking force changes from a minimum value to a maximum value with a very slight displacement of nut 46. On the other hand, the more flexible spring 57 is, the greater displacement of nut 46 must be in order to obtain a given braking force. It is thus possible to choose a spring 57, the characteristics of which are such that a whole range of adjustment of operating lever 47 can be used, which allows for a very gradual braking effort. In the illustrated embodiment, spring 57 is a helical spring. Therefore, the force it exerts is proportional to the distance it is compressed. As a result, the braking force is linked with the displacement of nut 46 by a function of the first degree; and the braking obtained is thus even more gradual throughout the range of rotation of lever 47, since, for each angular displacement of lever 47 by a given unit value, the braking force grows by a constant value.

When the brake is thus operated, brake plates 13 and 20 are prevented from turning in the direction of 38 by pawls 39 and 36 respectively.

When the crank is turned in the direction of 62, spool 6 is driven into rotation in the direction of 60 by means of toothed wheel 31, toothed pinion 19 and brake plates 13 and 20. Pawls 36 and 39 do not interfere such rotation. The line is thus wound on spool 6.

What is claimed is:

1. In a fishing reel comprising a housing rotatably supporting a line spool about a central shaft, a crank constructed and arranged to rotate said spool in a first line retrieval direction, said spool being freely rotatable in a second opposite direction, an improved brake mechanism for braking rotation of said spool in said second direction comprising:
   a first hydraulic cylinder arranged in one side wall of said housing;
   first and second pistons diametrically arranged in said first cylinder, said first piston being manually displaceable and said second piston being displaceable by fluid pressure applied by said first piston;
   brake means constructed and arranged to apply frictional braking forces to said spool;
   means operatively connecting said brake means to said second piston for application of said braking forces upon displacement of said second piston;
   a second hydraulic cylinder arranged in said one side wall of said housing in fluid connection with said first cylinder;
   a third piston arranged in said second cylinder; and
   biasing means positioned within said second cylinder constantly urging said third piston to apply fluid pressure upon said first and second pistons and said braking forces may be gradually applied by displacement of said first piston.

2. A fishing reel according to claim 1 wherein said biasing means is a helical spring arranged between said piston and an end of said second cylinder.

3. A fishing reel according to claim 1 wherein said first piston is a nut threaded on said central shaft for displacement in said first cylinder by rotation thereof.

4. A fishing reel according to claim 3 wherein said nut further includes an integral lever external of said housing for manual rotation thereof.

5. A fishing reel according to claim 1 wherein said second cylinder is positioned in said housing perpendicularly to said first cylinder.

6. A fishing reel according to claim 2 wherein said second cylinder includes a manually accessible cap threaded to an end thereof whereby the compression of said helical spring may be adjusted.

7. A fishing reel according to claim 1 wherein the cross-sections of said first, second and third pistons are of decreasing value.

8. A fishing reel according to claim 1 wherein said brake means comprises a pair of brake plates positioned on either side of said spool, each of said brake plates including an inwardly disposed friction gasket adapted to engage a side of said spool; and biasing means positioned between said spool and each of said plates to constantly urge said plates out of engagement from the sides of said spool.

9. A fishing reel according to claim 8 wherein said connecting means between said second piston and said brake means comprises a pinion integral with one of said brake plates bearing upon the external face of said second piston.

10. A fishing reel according to claim 9 wherein said pinion is driven by said crank to rotate said spool in said line retrieval direction.

* * * * *